United States Patent [19]

Orita

[11] Patent Number: 5,163,147
[45] Date of Patent: Nov. 10, 1992

[54] COMPUTER SYSTEM WITH FILE SECURITY FUNCTION

[75] Inventor: Yukio Orita, Tokyo, Japan

[73] Assignee: Kabushiki Kaisha Toshiba, Kawasaki, Japan

[21] Appl. No.: 575,439

[22] Filed: Aug. 30, 1990

[30] Foreign Application Priority Data

Aug. 31, 1989 [JP] Japan .............................. 1-225402

[51] Int. Cl.$^5$ ............................................. G06F 12/14
[52] U.S. Cl. .................................. 395/600; 395/425; 395/725; 364/DIG. 1; 364/286.5; 364/246.9; 364/253.2
[58] Field of Search ... 364/200 MS File, 900 MS File; 395/425, 600, 725

[56] References Cited

U.S. PATENT DOCUMENTS

| | | | |
|---|---|---|---|
| 4,621,321 | 11/1986 | Boebert et al. | 364/200 |
| 4,819,204 | 4/1989 | Schrenk | 364/900 |
| 4,845,715 | 7/1989 | Francisco | 364/200 X |
| 4,951,249 | 8/1990 | McClung et al. | 364/900 |
| 4,956,769 | 9/1990 | Smith | 364/200 |

Primary Examiner—Thomas M. Heckler
Attorney, Agent, or Firm—Finnegan, Henderson, Farabow, Garrett and Dunner

[57] ABSTRACT

In a computer system having a security function, environment profile information defining a file to be accessed and an executable user program are previously stored into a storage unit. The environment profile information is selected by operator profile information corresponding to ID information input via a work station by a user. A host computer executes the user program defined by the environment profile information. When a specified file access is requested after the execution of the user program, whether execution of the file access is permitted or not is determined according to access protection information. The access protection information is information having access types and file contents defined by the environment profile information.

13 Claims, 4 Drawing Sheets

OPERATOR PROFILE

| ID | PASS-WORD | USER'S NAME | USER NO. | AUTHORITY LEVEL | | FILE NAME OF EP INFORMATION | AUTHORITY LEVEL-ALTERATING DATA |
|---|---|---|---|---|---|---|---|
| | | | | MAIN (0~15) | SUB (0~255) | | |

FIG. 4

EP PROFILE

| EP INFORMATION FILE NAME | EP PASSWORD | EP AUTHORITY LEVEL | USER PROGRAM NAME (ONE) | FILE NAMES (1~600) TO BE ACCESSED | FILE PASSWORD |
|---|---|---|---|---|---|
| | | | | | |

FIG. 5

COMPUTER SYSTEM WITH FILE SECURITY FUNCTION

BACKGROUND OF THE INVENTION

1. Field of the Invention

This invention relates to a computer system having a security function, and more particularly to a security system for file access.

2. Description of the Related Art

There is provided a computer system which utilizes a work station as a terminal device and which can access files of a host computer via the terminal device. In such a computer system, it is required to provide a security function for permitting a specified user or users to operate the terminal device and access the file, thus attaining the security for information.

Such a security system includes a system which is known in the art or can be easily devised and in which a user list is set for each file to be protected so as to inhibit the file access even if a user other than the listed users makes an access request for the file. Further, a system is provided in which a file list for permitting access to the file for each user is set and a file access is inhibited when a file other than the listed files is accessed by a corresponding user. In addition a system is provided in which a pass word is previously set and only a user who inputs the pass word via the terminal device is permitted to access the file.

The above conventional security systems are designed to attain the security for information independently for each user based on the relation between the users and the files to be protected. For this reason, in the conventional security systems, it is difficult to attain the information security for each operation, that is, attain the information security according to the contents of the files or access types. In this case, the operation corresponds to the content of the process of a user program and the type of a file to be accessed is determined by the type of the user program. Further, the access type means the accessing content such as "deletion", "modification", "write-in", or "readout" with respect to a file to be accessed.

Now, a problem occurring in the conventional system is concretely explained. For example, when a user for effecting an operation of referring to a specified file erroneously effects an operation of writing information into the specified file, the specified file may be destroyed.

SUMMARY OF THE INVENTION

An object of this invention is to provide a computer system having a security function capable of attaining the security according to the content of a file and the access type at the time of accessing a file by a user so as to effect a reliable security operation for files.

According to this invention, there is provided a computer system having a security function, comprising a data input unit for inputting user recognizing ID information, instructions for access to various files and starting instructions for various user programs; a first storage unit for storing the various files and various user programs; a second storage unit for storing operator profile information corresponding to the ID information, environment profile information corresponding to the contents of the user programs and access protection information corresponding to the access types for the files; a user recognizing unit for reading out the operator profile information from the second storage unit according to the ID information input via the data input unit and effecting the user recognizing process based on the readout operator profile information; a program verifying unit for determining whether execution of the user program is permitted or not based on the environment profile information read out from the second storage unit in response to a starting request for the user program when a user recognized by the user recognizing unit is determined to correctly correspond to the operator profile information; and an access verifying unit for determining whether execution of file access is permitted or not based on the access protection information read out from the second storage unit when an access request is made with respect to a specified file stored in the first storage unit according to the user program which is permitted to be executed by the program verifying unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 shows the contents of OP information used in the embodiment; and

FIG. 5 shows the contents of EP information used in the embodiment.

DETAILED DESCRIPTION OF THE PREFERRED EMBODIMENT

Figure 1:
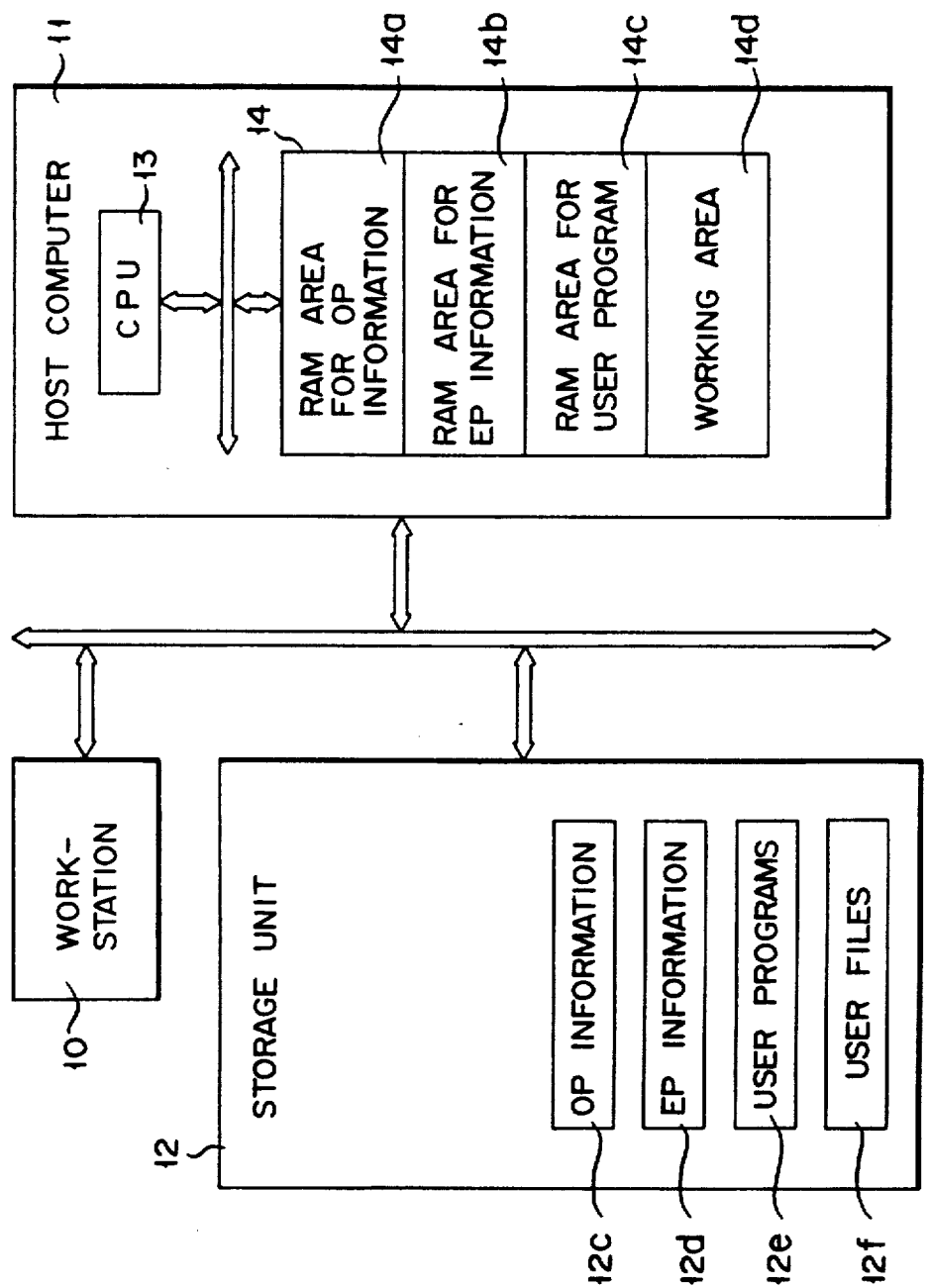
FIG. 1 is a block diagram showing the construction of a computer system according to on embodiment of this invention.

There will now be described an embodiment of this invention with reference to the accompanying drawings.

A computer system according to one embodiment of this invention includes a work station 10 used as a terminal device, a host computer 11 and an external storage unit 12. The work station 10 performs various data input operations necessary for the user to effect the file access with respect to the external storage unit 12. The host computer 11 performs various processes necessary for the security control in this invention. The external storage unit 12 is a hard disk, for example, and is operated under the control of the host computer 11.

The work station 10 includes a keyboard and a display unit. When the user operates the keyboard, the work station 10 inputs user recognizing ID information and the like to the host computer 11. The host computer 11 includes a central processing unit (CPU) 13 and a read/write memory (RAM) 14 constituting a main memory. The read/write memory 14 includes an area 14a for storing operator profile (OP) information, an area 14b for storing environment profile (EP) information, an area 14c for storing user programs and a work area 14d. The storage unit 12 previously stores OP information 12c, EP information 12d, user programs 12e and user profiles 12f. Access protection information 12a (not shown) is included in each of the user programs 12e and each of the user files 12f.

Figure 2:
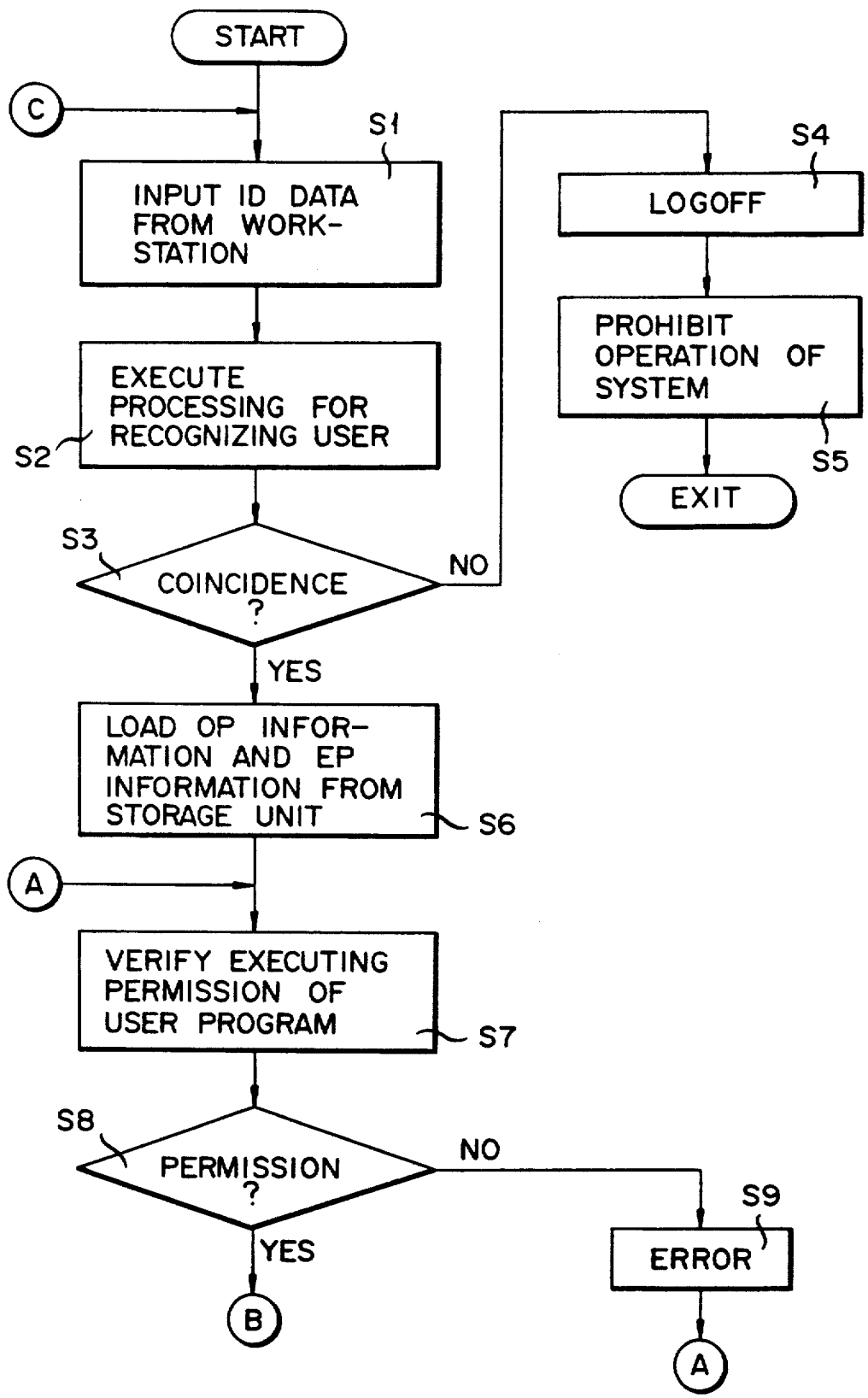
FIG. 2 is a flowchart for illustrating the operation of the above embodiment.
Figure 3:
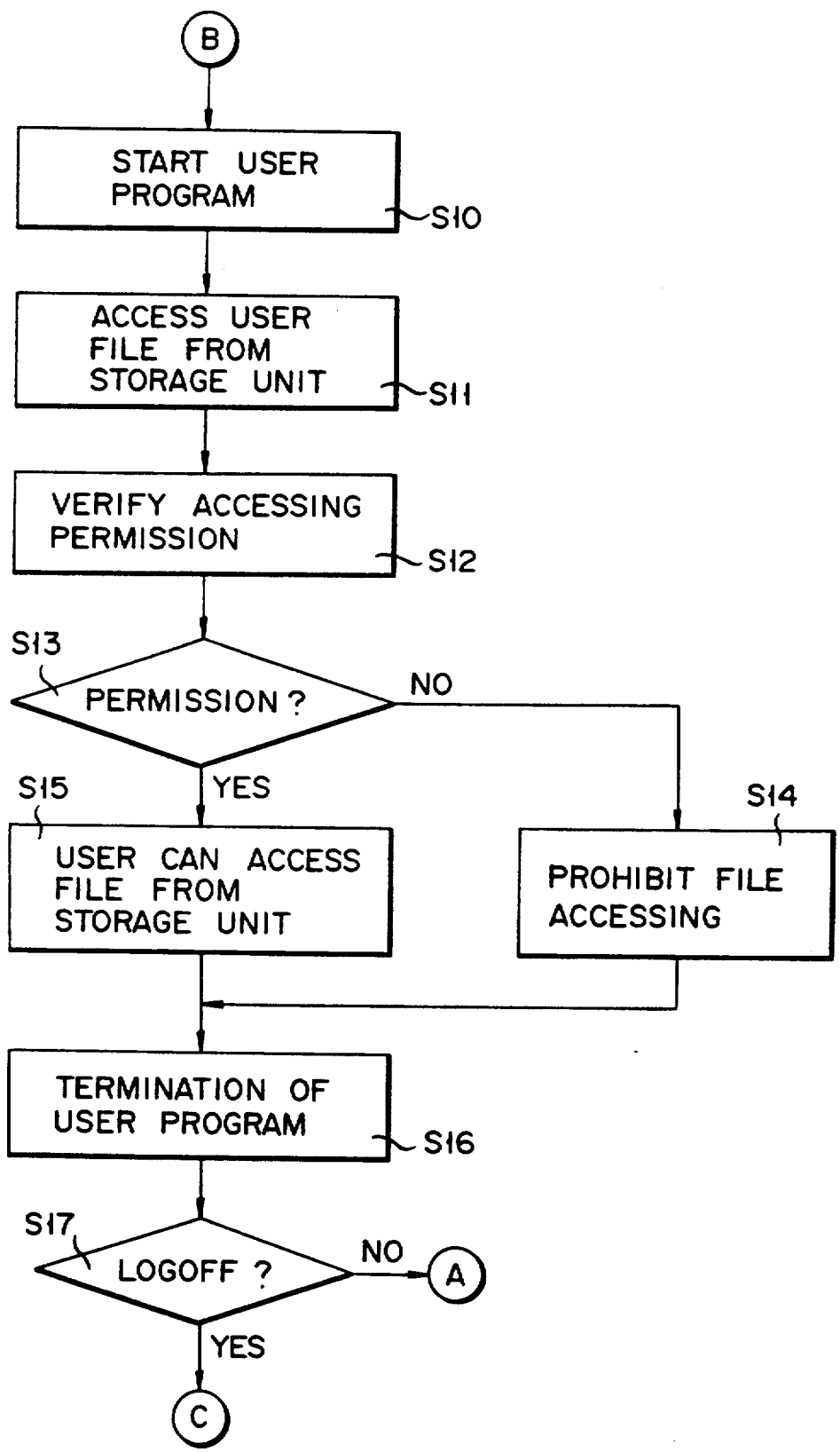
FIG. 3 is a flowchart for illustrating the operation of the above embodiment.

The user inputs ID information (incl. a password) by operating the keyboard of the work station 10 in order to access a necessary and specified file (step S1 shown in FIG. 2). In accordance with the need, the user inputs the name of an EP file and an EP password. The work station 10 specifies execution of the process for recognizing a user based on the ID information (logon operation). The host computer 11 performs the user recognizing process in response to the logon operation of the work station 10 (step S2). The host computer 11 searches for OP information, on the basis of the input ID information and password. That is, the host computer 11 recognizes a user as a registered user when the OP information 12c corresponding to the input ID information is registered in the storage unit 12 ("YES" in the step S3). In contrast, when OP information 12c corresponding to the input ID information is not registered, the host computer 11 determines that the user is not a registered user, and instructs the work station 10 to effect the logoff operation ("NO" in the step S3, step S4). The work station 10 effects the logoff operation and effects a specified operation to inhibit the user from using the system (step S5).

When the host computer 11 recognizes the user as a registered user, it reads out corresponding OP information 12c from the storage unit 12 and stores the same into the area 14a. As is shown in FIG. 4, the OP information 12c includes the following items: an ID necessary for logging on the system; a password; an authority level; a file name of EP information; and authority level-altering data. The authority level is determined by a main level and a sublevel. The main level is selected from 0 to 15, and a sublevel of 0 to 255 is selectable for each main level. Therefore, the total number of levels is 16×256. The file name of EP information corresponds to the job (i.e., a user program) which the user wants to execute. The authority level-altering data is used where the access to the file is desired for the job even if the authority level of the user does not allow the access to the file. For instance, if "15" is recorded in the authority level-altering data, the files having a level of up to "15" can be accessed by the user even if the authority level of the user is "10".

The host computer 11 reads the EP information 12d defined by the OP information 12c out of the storage unit 12 and stores it in the area 14b (step S6).

As is shown in FIG. 5, the EP information 12d includes the following items: an EP information file name; an EP password; an EP authority level; an activable user program name; access file names; and a file password. The EP information file name is used as identification data when an EP information file stored in the operator profile is accessed or when an EP information file input by the operator is accessed. The EP password is entered by the operator along with the name of an EP information file, and is used for checking whether the access to the EP information file is allowed or prohibited. The EP authority level is a level determined for the EP information. The EP authority level is compared with the authority level of the operator profile, so as to determine whether the access to the EP information file is allowed or prohibited. Even if an EP information file name having a high authority level is mistakenly recorded in the operator profile with respect to a low-authority-level user, the EP authority level prevents access to the EP information file of the high authority level. The activable user file name indicates a user program which can be activated. One user program is stored in one EP information file, and a user which is entitled to access the EP information file can open the user program stored in the EP information file. The access file names indicate user programs which can be accessed from the activable user program. The maximal number of access file names which can be designated by a user is 600. The file password is required for accessing a file since the file contains a password, along with the data indicating the access type. Since, in the present invention, the file password is recorded in the EP information file beforehand, a user need not be informed of the file password, so that the security of the file is ensured.

Where the enters the EP information name, together with ID information, by operating the keyboard of the work station 10, the host computer 11 reads the corresponding EP information 12d out of the storage unit 12 and stores it in the area 14b. At this time, a check is executed, on the basis of the EP password.

Next, the job program defined in the EP information 12d is activated. If the activation of another job program is commanded by the operator, a check is made to see whether or not the execution of the job program commanded by the operator is permitted, prior to the actual execution of the job program (step S7). This check is carried out by comparing the authority level of the OP information 12c with that of the user program. The host computer 11 reads out a user program which is permitted to be executed from the storage unit 12 and stores the same into the area 14c. On the other hand, when execution of the user program which the user has requested to start is inhibited, the host computer 11 effects an error process (step S9). The work station 10 displays occurrence of an error on the screen of a display unit, for example, and displays a request for specifying a user program or EP information 12d again.

The CPU 13 of the host computer 11 starts the user program stored in the area 14c and effects the data processing operation corresponding to the user program (step S10). When an access request for a user file in the storage unit 12 is made by the user program (step S11), permission of execution of the file access is verified. The host computer 11 determines whether or not execution of access to the file requested to be accessed is permitted based on access protection information 12a added to respective files (step S12). The access protection information 12a includes information on the password and access type of each file. On the basis of this information, a file is prevented from being accessed in a prohibited manner when the access to the file is performed from the user program. The host computer 11 compares the content (deletion, modification, write-in, readout or the like) of the access type which is to be executed by the user program and the password stored in the EP information 12d defining the user program with the contents of access protection information 12a of corresponding files, and permits the file access if they coincide with each other ("YES" in the step S13). On the other hand, if they do not coincide with each other, the file access requested is inhibited (step S14). Concretely speaking, such a case occurs when an access of "deletion", "modification" or "write-in" is requested for a specified file when access types of "deletion", "modification" and "write-in" are inhibited for the specified file and only the access of "readout" is permitted, for example.

When the file access is permitted, the user may access the specified file according to execution of the user program (step S15). As a result, the user can make use of the file by displaying the contents of the accessed file on the screen of the display unit of the work station 10. When the user program is completed, it is determined whether or not the system is continuously used (step S16, S17). When the user continuously uses the system and requests to start another user program, the process from the step S7 is started. Further, when use of the system is ended (logoff operation), the system is set in the nonoperative condition until a new logon operation is effected. When the new logon operation is effected, the process from the step S1 is started.

In the security system of this invention, determination on permission of execution of the user program requested to be started by the user is made based on the EP information 12d. That is, execution of the user program which is not defined by the EP information 12d is inhibited. In addition, the user program is allotted with an authority level, and access to the file by a user is prohibited if the user's authority level is lower than that of the user program. When an access request for a specified file is generated according to the user program which is permitted to be executed, determination of permission of execution of the access is made based on the access protection information 12a. That is, only the access corresponding to a specified access type can be permitted for a file of the contents defined by the EP information 12d. Further, in a case where an access request for a specified file does not meet the condition of an access type and the contents of a file defined by the access protection information 12a, the file access is inhibited. For example, even if the user erroneously specifies the access type "deletion" for a file to which the access type of "deletion" is inhibited, the file will not be deleted.

Therefore, the security can be attained not for each user as in the conventional case but for each operation based on the user program and the file access thereof. In other words, the security which corresponds to the contents of a file corresponding to the operation and the access type thereof can be realized. As a result, even if the user who intends to effect the operation of referring to a specified file has erroneously effected the operation of deleting the specified file, the specified file can be prevented from being destroyed. That is, a reliable security for the file can be attained.

Further, since the EP information 12d can be assigned to a plurality of users, the security can be attained independently for each group including a plurality of users. In addition, since an object to be protected is determined according to the contents of a operation (user program) defined by the EP information 12d, the object to be protected can be easily changed by changing the contents of the EP information 12d.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system with file security function, comprising:
   first storage means for storing user files and user programs;
   input means for inputting ID information for recognizing a user;
   second storage means for storing operator profile information corresponding to the ID information, environment profile information corresponding to the contents of the user programs, and access protection information corresponding to access types for the user files;
   user recognizing means for reading out the operator profile information from said second storage means according to the ID information input via said input means and performing a process to recognize a user based on the readout operator profile information;
   program verifying means for reading out the environment profile information from said second storage means when one of the user programs is requested to start, and for determining whether execution of the user program is permitted or not based on the environment profile information when the user recognized by said user recognizing means is recognized to correctly correspond to the operator profile information; and
   access verifying means for reading out the access protection information from said second storage means when an access request from the user is made with respect to a specified file stored in said first storage means according to the user program which is permitted to be executed by said program verifying means, and for determining whether execution of file access is permitted or not based on the access protection information.

2. A system according to claim 1, wherein said user recognizing means effects a logoff operation to inhibit use of the system when the result of recognition of the recognizing process by the user shows that the user cannot be recognized.

3. A system according to claim 1, wherein said program verifying means compares the name of a user program specified by the environment profile information with the name of a user program requested to be started, permits execution of the user program requested to start when the comparison result shows a coincidence between the compared names, and effects an error process when the comparison result shows a noncoincidence between the compared names.

4. A system according to claim 1, wherein said access verifying means compares the content of an access type specified by the access protection information with the access content of the user program, permits execution of the file access when the comparison result shows a coincidence between the compared contents, and effects an error process when the comparison result shows a noncoincidence between the compared contents.

5. A system according to claim 1, wherein said environment profile information is constructed by information including the content of the user program and the file content to be accessed.

6. A system according to claim 1, wherein said access protection information in constructed by information including the access contents having the contents of "deletion", "modification", "write-in" and "readout" for the file and the file contents.

7. A system according to claim 6, wherein said access verifying means compares the file content specified by the access protection information with the file content to be accessed by the user program, permits execution of the file access when the comparison result shows a coincidence between the compared contents, and effects an error process when the comparison result shows a noncoincidence between the compared contents.

8. A security control method for a computer system, comprising the steps of:

storing user files and user programs into first storage means;

processing ID information as inputted for recognition of a user;

storing into second storage means operator profile information corresponding to the ID information, environment profile information corresponding to contents of the user programs, and access protection information corresponding to access types for the user files;

reading out the operator profile information from said second storage means according to the ID information and performing a user recognizing process based on the readout operator profile information;

reading out the environment profile information from said second storage means when one of the user programs is requested to start, and determining whether execution of the user program is permitted or not based on the environment profile information when the user is recognized to correctly correspond to the operator profile information; and reading out the access protection information from said second storage means when an access request from the user is made with respect to a specified file stored in said first storage means according to the user program which is permitted to be executed, and determining whether execution of file access is permitted or not based on the access protection information.

9. A computer system with file security function, comprising:

input means for inputting user recognizing ID information;

first storage means for storing operator profile information which includes the user recognizing ID information and an environment profile information name corresponding to the user recognizing ID Information;

second storage means for storing environment profile information which includes at least information on an activable user program, and a file name to be accessed from the user program, said environment profile information being stored in correspondence to each environment profile information name;

third storage means for storing information representing at least an access type which is permitted for each file to be executed from the user program;

means for checking whether or not the operator profile information which corresponds to the user recognizing ID information input from the input means is stored in the first storage means;

means for accessing the environment profile information stored in the second storage means on the basis of the environment profile information name stored in the checked operator profile information, and for activating an activable user program corresponding to the accessed second storage means; and means for determining whether or not an access type to be executed from the user program is permitted, on the basis of the information stored in the third storage means.

10. A system according to claim 9, wherein said first storage means further stores information on a first authority level corresponding to the user recognizing ID information, and said second storage means further stores information on a second authority level corresponding to the environment profile information, said system further comprising:

means for comparing the first authority level and the second authority level with each other, and for prohibiting access to the environment profile information stored in the second storage means if the first authority level is lower than the second authority level.

11. A system according to claim 10, wherein said first storage means further stores information on a third authority level which is obtained by updating the first authority level corresponding to the user recognizing ID information, said system further comprising:

means for comparing the third authority level and the second authority level with each other, and for allowing access to the environment profile information stored in the second storage means if the third authority level is higher than the second authority level.

12. A system according to claim 9, wherein said second storage means further stores information on a password corresponding to the environment profile information, and said input means inputs the environment profile information name and a password corresponding to the environment profile information, said system further comprising:

means for comparing the password input from the input means with the password stored in the second storage means, and for prohibiting access to the environment profile information stored in the second storage means if the two passwords are different.

13. A system according to claim 9, wherein said second storage means further stores information on a file password corresponding to a file name to be accessed from the user program, and said third storage means further stores information on a file password corresponding to each file to be accessed from the user user program, said system further comprising:

means for accessing a file designated by the user program on the basis of the file password stored in the second storage means.

* * * * *

UNITED STATES PATENT AND TRADEMARK OFFICE
CERTIFICATE OF CORRECTION

PATENT NO. : 5,163,147
DATED : November 10, 1992
INVENTOR(S) : Yukio Orita

It is certified that error appears in the above-identified patent and that said Letters Patent is hereby corrected as shown below:

Claim 9, Column 7, Line 59 change "Information" to --information--.

Claim 13, Column 8, Line 61 delete "user" (second occurrence).

Signed and Sealed this

Eighteenth Day of January, 1994

Attest:

BRUCE LEHMAN

Attesting Officer

Commissioner of Patents and Trademarks